(12) United States Patent
Motzer et al.

(10) Patent No.: US 8,279,412 B2
(45) Date of Patent: Oct. 2, 2012

(54) POSITION AND ORIENTATION DETERMINATION USING MOVEMENT DATA

(75) Inventors: William P. Motzer, Seattle, WA (US);
Gary E. Georgeson, Federal Way, WA (US); Scott W. Lea, Renton, WA (US);
Peter J. Hellenbrand, Seattle, WA (US);
James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 290 days.

(21) Appl. No.: 12/640,211

(22) Filed: Dec. 17, 2009

(65) Prior Publication Data

US 2011/0149266 A1 Jun. 23, 2011

(51) Int. Cl.
*G01C 3/08* (2006.01)
(52) U.S. Cl. ....... 356/4.01; 356/3.01; 356/4.1; 356/5.01
(58) Field of Classification Search ........ 356/3.01–28.5, 356/139.01–139.1, 3.01–3.15, 4.01–4.1, 356/5.01–5.1, 6–22, 28
See application file for complete search history.

(56) References Cited

U.S. PATENT DOCUMENTS

| | | | |
|---|---|---|---|
| 2006/0023203 A1* | 2/2006 | Gatsios et al. | 356/139.01 |
| 2006/0180648 A1* | 8/2006 | Miller et al. | 235/375 |
| 2007/0038409 A1 | 2/2007 | Gilson et al. | |
| 2009/0073034 A1 | 3/2009 | Lin | |
| 2009/0112349 A1* | 4/2009 | Cobb et al. | 700/114 |
| 2010/0102980 A1 | 4/2010 | Troy et al. | |

FOREIGN PATENT DOCUMENTS

| | | | |
|---|---|---|---|
| DE | 102005004155 | * | 3/2006 |
| DE | 10 2005 004155 A1 | | 8/2006 |
| WO | WO 00/39576 A1 | | 7/2000 |

OTHER PUBLICATIONS

Coschurba et al., Research Issues in Developing a Platform for Spatial-Aware Applications, ACM SIGOPS European Workshop, XP-002353381, Sep. 17, 2000, (6 pgs).
International Search Report and Written Opinion of the International Searching Authority, International Application No. PCT/US2010/056564, European Patent Office, Feb. 25, 2011, (12 pgs).

\* cited by examiner

*Primary Examiner* — Luke Ratcliffe
(74) *Attorney, Agent, or Firm* — Toler Law Group (57) ABSTRACT

Position determining systems and methods are provided. A particular portable device includes a calibration component to communicate with a local positioning system to determine an initial position and orientation of the portable device within a local coordinate system associated with a target structure. The portable device also includes at least one movement sensor to detect movement of the portable device. The portable device further includes a processor to determine a measured position and orientation of the portable device based on the initial position and orientation of the portable device within the local coordinate system and based on the detected movement of the portable device.

20 Claims, 5 Drawing Sheets

POSITION AND ORIENTATION DETERMINATION USING MOVEMENT DATA

FIELD OF THE DISCLOSURE

The present disclosure is generally related to position and orientation determination using movement data.

BACKGROUND

Assembly and maintenance of large objects, such as repositionable structures, may be assisted by the use of positioning systems to guide placement of components. For example, aircraft may be assembled in facilities that include position determination systems and equipment to measure the position of certain components of the aircraft, such as wings and empennage, to ensure proper placement of the components. Other large-scale assembly facilities may use similar position determination systems. Certain position determination systems are limited to line-of-sight measurements. These position determination systems may not be useful to determine position information in interior or other occluded areas of the structure being assembled or maintained. For example, a laser-based system that is oriented to determine the position of the wings of an aircraft may not be able to also determine positions of components within a cargo bay of the aircraft.

SUMMARY

Position determining systems and methods are disclosed. A particular method includes initializing a portable device capable of sensing motion by storing initial position and orientation data in a memory of the portable device. The initial position and orientation data may indicate position and orientation of the portable device within a local coordinate system associated with a target structure, such as a repositionable structure or mobile platform. The method also includes detecting movement of the portable device. The method further includes determining measurement data based on the detected movement. The method also includes determining a spatial relationship of the portable device relative to the target structure based at least partially on the initial position and orientation data and the movement data.

In a particular embodiment, the portable device includes a calibration component to communicate with a local positioning system to determine an initial position and orientation of the portable device within a local coordinate system associated with a target structure. The portable device also includes at least one movement sensor to detect motion of the portable device. The portable device may include a processor to determine a measured position and orientation of the portable device based on the initial position and orientation of the portable device within the local coordinate system and the detected motion of the portable device. Additionally or in the alternative, the portable device may have a wired or wireless connection to a remote processor for the determination of measurements based on motion detected by the portable device.

A particular positioning system includes a plurality of local position detectors to determine a position of a location of interest on or within a target structure within a first coordinate system. The positioning system also includes a processor to determine measurements in a second coordinate system of the target structure based on the position and orientation of the target structure in the first coordinate system and one or more electronic representations of the target structure. The positioning system further includes a portable device, such as a device to sense relative motion. The portable device includes a memory to store an initial position and orientation of the portable device within the second coordinate system. The portable device further includes at least one movement sensor to detect movement of the portable device. The portable device also includes a processor to determine a measured position and orientation of the portable device based on the initial position and orientation of the portable device within the second coordinate system and the detected movement of the portable device.

The features, functions, and advantages that have been described can be achieved independently in various embodiments or may be combined in yet other embodiments, further details of which are disclosed with reference to the following description and drawings.

DETAILED DESCRIPTION

The present disclosure relates to a portable device that interacts with a positioning system to determine position information at locations where the positioning system cannot independently determine the position information due to, for example, access, expense, time, capacity or functional limitations of the positioning system. The portable device may be useful for maintenance or assembly of large-scale structures, such as aircraft, watercraft, land craft, space craft, oil platforms, heavy equipment, or other repositionable or stationary structures. Such target structure may be assembled in facilities that use positioning systems to improve precision, accuracy or speed of an assembly or maintenance process. Certain positioning systems, such as laser positioning systems, may be limited to uses that are in a direct line-of-sight to a position sensing device. Accordingly, positions inside the target structure may be difficult to determine. The portable device may be operable to determine position information inside the target structure or at other locations. Additionally, the portable device may use the position and orientation information to provide other useful functions to an operator, such as identifying locations of particular components, identifying components based on location, gathering and storing information at particular locations, and so forth.

Figure 1:
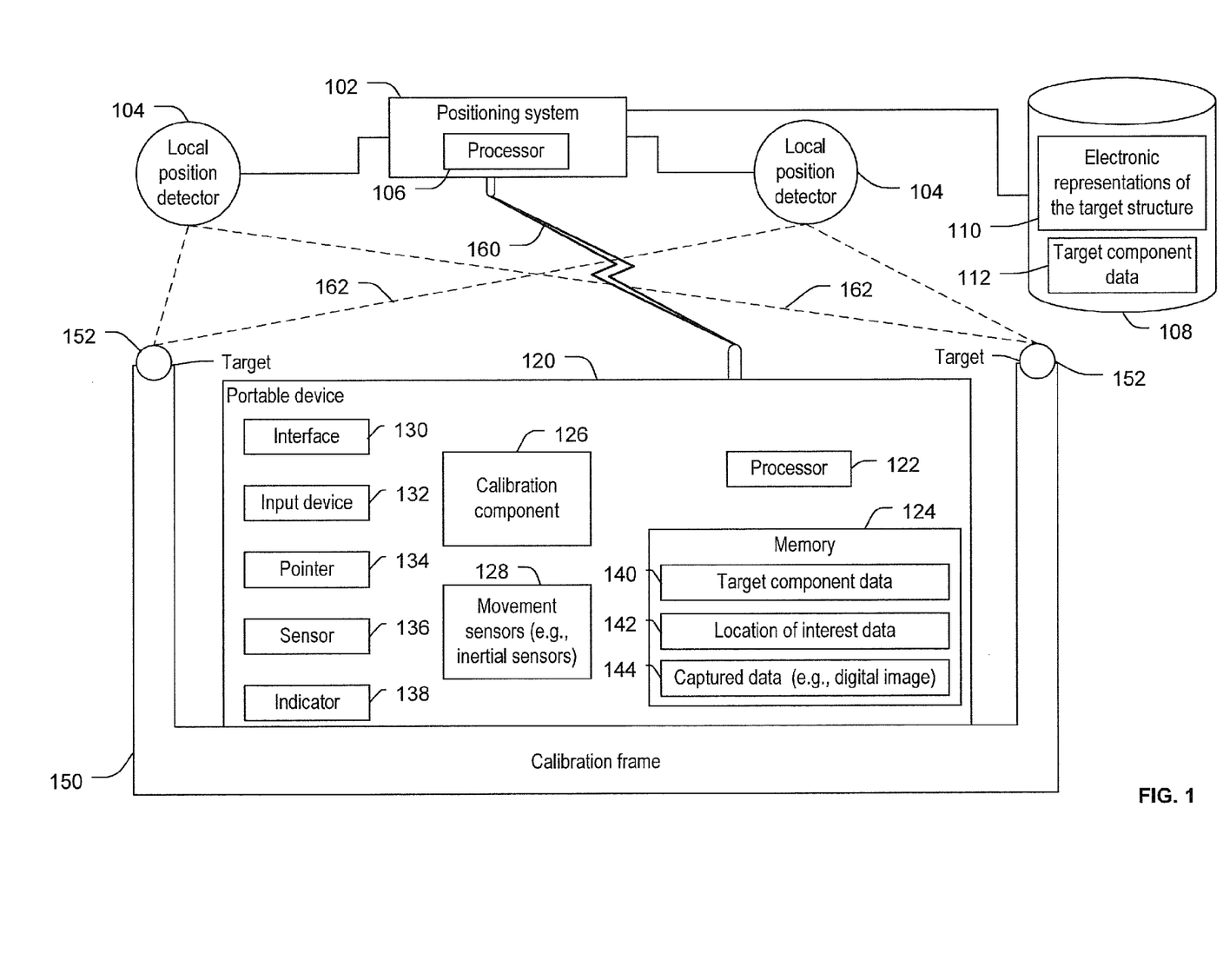
FIG. 1 is a block diagram of a first particular embodiment of a local positioning system including a portable device.

FIG. 1 is a block diagram of a particular embodiment of a local coordinate positioning system, also know as a local positioning system. The system includes a portable device 120 that interacts with a positioning system 102. The positioning system 102 may include a local positioning system or a non-local positioning system. A local positioning system may measure locations and describe the locations in the specific coordinate system associated with an object being measured. A measurement device, such as the portable device 120, may be calibrated to the local coordinate system using reference information in the specific coordinate system, such as a survey marker or another reference point. The reference information is used to determine the relative position and orientation of the measurement device to a target structure. Local positioning systems may use optical or electromagnetic measurements sensors (e.g., laser measurement systems and the like) to make the measurements, and then transform these device-based measurements into measurements defined in the local coordinates of the target structure. A non-local positioning system may determine or specify locations relative to a reference coordinate system that is not associated with the target structure. For example, the reference coordinate system may be associated with a building or another geographic location, such as a dry dock facility. Raw output (e.g., latitude-longitude) from a global positioning system that uses satellite orbital positions as references would be an example of a non-local positioning system, as is a measurement given by a simple tape measure (which provides distance relative to the edge of its housing). In their basic forms, these devices provide measurements without regard to the coordinate system of the object being measured. It is up to the user (or some other system) to determine how those results apply to the situation.

Certain positioning systems 102 may not function well when obstructions are present. For example, laser positioning systems may only operate when a direct line of sight is available between a laser source and a target. Additionally, certain positioning systems 102 may be difficult, expensive or time consuming to configure or to add new measurement locations to. For example, it may be undesirable to configure a laser positioning system to identify positions of targets at every possible location within an area served by the laser positioning system. In a particular embodiment, the portable device 120 enables determination of position and orientation information in areas not serviced directly by the positioning system 102 (e.g., because the areas are outside the direct measurement area of the positioning system 102 or because obstructions reduce accuracy of measurements taken by the positioning system 102). For example, large-scale manufacturing and maintenance facilities may use a local positioning system, such as the positioning system 102, to guide assembly and maintenance functions. Examples of such facilities may include aircraft assembly facilities, ship building facilities, oil platform and other large equipment manufacturing and maintenance facilities. Such facilities may use line-of-sight measurement systems, such as laser positioning systems, to determine position information exterior to a system being assembled (e.g., an aircraft, ship, etc.). However, such line-of-sight measurement systems may be difficult, expensive or unwieldy to utilize at certain location, such as locations inside the system being assembled. The portable device 120 may be utilized by the personnel working inside the system being assembled to determine position and orientation information.

The positioning system 102 may include one or more local position detectors 104 to determine a position of a location on a target structure (not shown in FIG. 1). In a particular embodiment, the local position detectors 104 include laser devices adapted to transmit laser beams 162 at target locations 152. The positioning system 102 may also include a processor 106. The target locations 152 may be at known locations on the target structure and may be used by processor 106 and coordinate transformation software to calibrate the local position detector(s) 104 to a target structure coordinate system. The target structure may include an aircraft, a spacecraft, a land craft, a watercraft, or another repositionable structure that is moved into a location for maintenance, for assembly, or for other purposes. In other examples, the target structure may be a stationary object. The processor 106 of the positioning system 102 may have access to a database 108 that includes electronic representations 110 of the target structure. For example, the electronic representations 110 may include electronic diagrams, drawings or models of the target structure, such as computer-aided design drawings or three-dimensional models that provide local position information of locations of interest on the target structure. Additionally, the electronic representations may include design or as-built drawings or measured data (e.g., measurements taken for use by the local positioning system) indicating specifics (e.g., dimensions or characteristics) of the target structure.

The portable device 120 includes a calibration component 126. The calibration component 126 communicates with the positioning system 102 to specify an initial position and orientation of the portable device 120. For example, the initial position and orientation may be specified with reference to a specific location on the target structure.

The portable device 120 may also include at least one movement sensor 128. For example, the at least one movement sensor 128 may include one or more inertial sensors (e.g., microelectromechanical sensors, such as accelerometers or gyroscopes) capable of measuring linear and rotational acceleration and/or velocity. The at least one movement sensor 128 may detect movement of the portable device 120 after the initial position and orientation of the portable device 120 is determined. To illustrate, the portable device 120 may be initialized in a calibration frame 150. The position and orientation of the calibration frame 150 may be known or may be determined by the positioning system 102. The position and orientation of the calibration frame 150 may be stored in a memory 124 of the portable device 120. In a particular embodiment, the position and orientation of the calibration frame 150 are initialized in the memory 124 as an origin position and orientation of the local coordinate system. That is, the initial position and orientation of the portable device 120 in the calibration frame 150 are the origin from which relative motions of the portable device 120 are measured. In this embodiment, the position and orientation of the portable device 120 can be determined by distance and direction away from the origin location (i.e., the calibration frame 150). In other embodiments, other origin locations are selected, such as a predetermined reference location on the target structure. A spatial relationship between the calibration frame 150 and the local position detectors 104 may be known or determined. For example, the calibration frame 150 may be placed at a known location on the target structure. In addition or in the alternative, the calibration frame 150 may include the target locations 152 that are detectable by the local positioning detectors 104 to enable the positioning system 102 to determine the position and orientation of the calibration frame 150 in the target structure. After the relative positions and orientations are determined from motions of the portable device 120, the relative positions and orientations are used along with the calibration frame position and orientation to compute the resulting position and orientation of the portable device 120 in the coordinate system of the target structure.

The portable device 120 may also include a processor 122. The processor 122 may determine a measured position and orientation of the portable device 120 based on the initial position and orientation of the portable device 120 and the detected movement of the portable device 120. For example, the processor 122 may determine the measured position and orientation of the portable device 120 within the target structure's local coordinate system. In a particular embodiment, the memory 124 is accessible to the processor 122. The memory 124 may store target component data 140. The target component data 140 may specify locations of components of the target structure in the local coordinate system. The processor 122 may determine a spatial relationship of the portable device 120 to at least one of the components based on the measured position and orientation and the target component data 140. For example, the processor 122 may determine a distance from the portable device 120 to at least one of the components, a direction from the portable device 120 to at least one of the components, or both.

The portable device 120 may also include an input device 132. The input device 132 may be used to receive target component data 140 specifying a target component of the components of the target structure, or location of interest data 142 on the component of the target structure. For example, the input device 132 may be used by an operator to input information identifying a particular component of the target structure that the operator desires to locate (i.e., the target component). The processor 122 may determine information about a spatial relationship between the portable device 120 and the target component based on the measured position and orientation and the target component data 140.

The portable device 120 may also include a pointer 134. The pointer 134 may be adapted to point to a location of the target component based on the spatial relationship. For example, the pointer 134 may include a needle, one or more light indicators, a display, or another device at the portable device 120 or coupled to the portable device 120 that points in the direction of the target component. In another example, the pointer 134 may include a laser or other light based pointing device. In this example, the pointer 134 may direct a beam of light in the direction of the target component. An on-board video camera (not shown) may also be used to indicate the pointing direction of the portable device 120.

In a particular embodiment, the portable device 120 includes an indicator 138. The processor 122 may activate the indicator 138 based on the spatial relationship of the portable device 120 to the target structure. In various embodiments, the indicator 138 includes different types of indication devices that are triggered to indicate various conditions. For example, the processor 122 may activate the indicator 138 when the portable device 120 is within a predetermined threshold distance of the target component. In another example, the processor 122 may activate the indicator 138 when the portable device 120 is within or approaching a particular portion of the target structure, such as an area that is off limits to certain personnel or an area that requires special protective equipment for entry. In another example, the indicator 138 may include an audible indicator, a visible indicator, or another indicator to indicate to the user that the portable device 120 is proximate to the target component (e.g., when a second threshold distance is satisfied).

In another example, the indicator 138 includes a laser projection device that can trace an outline or other shape associated with the target component or associated with a location where the target component should be. For example, when the target component data 140 identifies a component to be installed into the target structure, the laser projection device may project an outline of the target component at an installation location of the target component. The indicator 138 may also include a device to indicate that the target component may be out of a line of sight of the operator, such as behind a second component. To illustrate, when the target component is stored within a panel, within a different compartment, or behind another component of the portable device 120, the indicator 138 may indicate that the target component is out of the line of sight of the operator.

The processor 122 may trigger the indicator 138 when a threshold distance is satisfied. The processor 122 may trigger different indicators 138 when different threshold distances are satisfied. For example, a first indicator may be triggered when a first threshold distance is satisfied and a second indictor may be triggered when a second threshold distance is satisfied. The first threshold distance may be different from the second threshold distance, and the first indicator may be distinct from the second indicator. For example, the first indicator may include a first audible tone and the second indicator may include a second audible tone. In another example, the first indicator may include an audible tone and the second indicator may include a visible indication, such as a light. In yet another example, the first indicator may include a first visual indication, such as a first light and the second indicator may include a second visual indication, such as a second light. In this example, the lights may be visually distinct, such as different colors or at different locations on the portable device 120.

The threshold distance or the threshold distances may be determined based on an identification of the target component. For example, a larger threshold distance may be determined for a larger component, and a smaller threshold distance may be determined for a smaller component. In another example, a larger threshold distance may be selected for a component that is expected to be visible and a smaller threshold distance may be selected for a target component that is expected to be obscured (e.g., behind a panel or other component). In a particular embodiment, one or more of the indicators are activated to indicate a direction to the target component.

The portable device 120 may include a sensor 136. The sensor 136 may include a digital image sensor, a safety sensor (e.g., a gas or thermal sensor), a magnetometer, a non-destructive test or inspection sensor (e.g., an ultrasonic test sensor, a radiographic test sensor, an eddy-current test sensor, etc.), another sensor, or any combination thereof. The sensor 136 may capture data at the position of the portable device 120. The processor 122 may store captured data 144 (e.g., a captured digital image) with position data in the memory 124.

In a particular embodiment, the portable device 120 includes an interface 130. The interface 130 may enable communication between the portable device 120 and one or more remote devices (such as a device of the positioning system 102 or the database 108). The interface 130 may include a wired interface, such as an Ethernet interface, a Universal Serial Bus (USB) interface, another standard or proprietary wired interface, or any combination thereof. The interface 130 may also or in the alternative include a wireless interface. For example, the interface 130 may send wireless transmissions 160 to communicate with the remote device. The wireless transmissions 160 may include infrared transmissions, radio frequency transmissions or another wireless transmission. The interface 130 may be used to initialize the portable device 120 or to send data gathered by the portable device 120 to the remote device. For example, the wireless transmissions 160 may be used to send the data descriptive of the measured position of the portable device 120 and the captured data 144 to the remote device. In another example, the interface 130 may be used to send target component data 112 from the database 108 to the portable device 120. To illustrate, the database 108 may include the electronic representations 110 of the target structure. The electronic representations 110 of the target structure may include design or as-built drawings or three dimensional electronic models of the target structure. Thus, the electronic representations 110 of the target structure may be relatively large electronic files. Due to size or cost constraints, the memory 124 of the portable device 120 may not have capacity to store all of the electronic representations 110 of the target structure. Accordingly, the memory 124 of the portable device 120 may store only a relevant portion of the electronic representations 110 of the target structure, such as the target component data 112, 140.

In operation, the portable device 120 may be used by an operator to locate the target component of the target structure, to gather sensed data within the target structure, to identify a component at a particular location of the target structure, or for other purposes. To illustrate, an operator attempting to locate the target component may input the target component data 140 identifying the target component via the input device 132. The position of the target component may be determined by the processor 122 of the portable device 120 or by a processor 106 of a remote device based on the electronic representations 110 of the target structure and the target component data 112, 140. The indicator 138 may provide information to the operator regarding a direction, a distance, or the direction and distance to the target component. Additionally, the indicator 138 may provide other information to aid the operator in locating the target component. For example, the indicator 138 may include a display screen that displays a text description of the target component or the location of the target component, displays a photograph or diagram illustrating the target component, etc. In another example, the indicator 138 may include one or more lights, moveable arrows or other devices that indicate the direction or distance to the target component. In yet another example, the indicator 138 may include a pointer, such as a visible laser, that points in the direction of the target component. In still another example, the indicator 138 may include one or more audible or haptic output devices to indicate a direction or distance to the target component. To illustrate, a vibrating element or a buzzer may be triggered when the operator moves the portable device 120 to within a predetermined distance of the target component. The predetermined distance may be selected based on how easily the operator would be expected to identify the component. For example, the predetermined distance may be shorter (i.e., nearer to the component) for smaller components than for larger components. In another example, the predetermined distance may be shorter when the component would normally be obscured from view by the operator by another component.

To illustrate another operational example, an operator may use the portable device 120 to gather or store the captured data 144. For example, when the operator is performing an inspection of the target structure, the portable device 120 may be used to capture and store inspection findings along with location information. To illustrate, the portable device 120 may be carried by the operator during non-destructive testing and inspection. The sensor 136 of the portable device 120 may be used to capture the captured data 144, which may be stored with location information indicating where the captured data 144 was captured. In another example, the sensor 120 may include an image sensor. When the operator identifies a concern, the image sensor may be used to capture an image of the area of concern, which may be stored as the captured data 144 along with the location where the image was captured.

To illustrate another operational example, the portable device 120 may be used by the operator to assist with identifying a component at a particular location of the target structure. For example, the input device 132 may be used by the operator to select a particular position. The processor 122 of the portable device 120 or the processor 106 of the remote device may determine components of the target structure that are near the particular position. In a particular embodiment, the pointer 134 can be used by the operator to point to the particular component. For example, the pointer 134 may include a laser device that generates a visible beam of light. The operator may point the beam of light at the component and use the input device 132 to generate a query regarding the identity of the component. The query may request information regarding the component, such as an identification of the component, a purpose of the component, maintenance or assembly data regarding the component (e.g., torque specifications), or any combination thereof.

Figure 2:
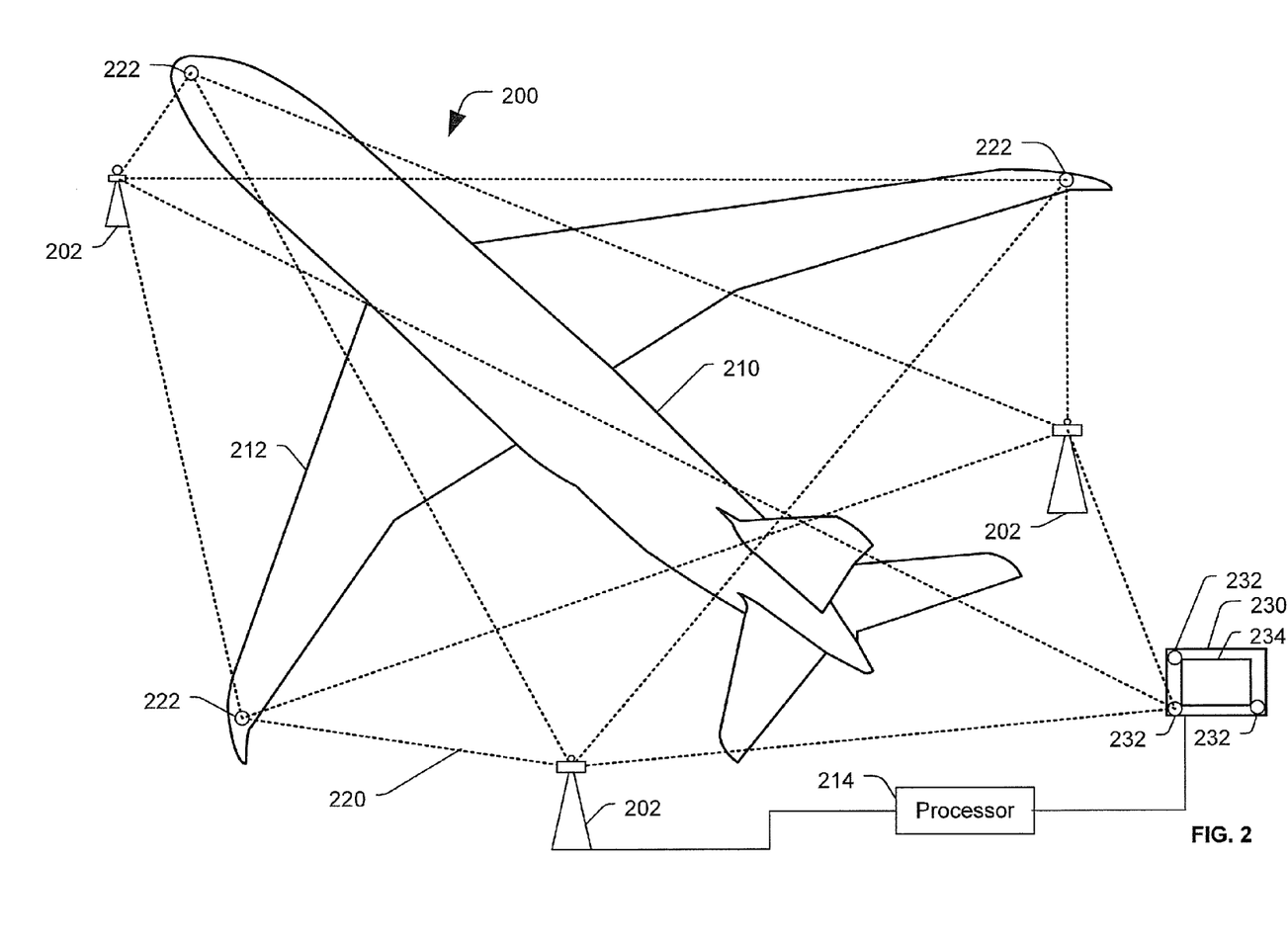
FIG. 2 is an illustration of a second particular embodiment of a local positioning system including a portable device.

FIG. 2 is an illustration of a particular embodiment of a local positioning system. The local positioning system may include one or more local position detectors 202 to determine a position of a location of interest in or on a target structure 200 within a first coordinate system. In a particular embodiment, the local position detectors 202 include laser devices adapted to direct laser beams 220 at calibration targets 222 and to determine positions of the calibration targets 222 within the first coordinate system. Additionally, each of the local position detectors 202 may include a target so that each of the local position detectors 202 can determine positions of the other local position detectors 202. Although only three local position detectors 202 are illustrated in FIG. 2, the local positioning system may include more or fewer local position detectors 202 depending on the specific implementation.

The local position detectors 202 may be placed at known locations within the first coordinate system, such as a coordinate system associated with a manufacturing or maintenance area. Alternatively, the position detector 202 may be placed at a location that is initially unknown, and then use known reference locations on the target structure to determine its relative position and orientation to the target in the coordinate system of the target structure. The target structure 200 may include an aircraft, a spacecraft, a land craft, a watercraft, or another repositionable structure that is moved into the local coordinate system for maintenance, for assembly, or for other purposes. Target structure 200 may also include stationary objects such as buildings, or large objects moving at a constant velocity (zero acceleration) on which all elements within the environment are stationary relative to each other, such as a cruise ship or an aircraft carrier. The calibration targets 222 may be applied to the target structure 200 for sensing by the local position detectors 202, or the calibration targets 222 may be features of know location specified in the local coordinates of the target structure 200. For example, as illustrated in FIG. 2, the target structure 200 is an aircraft and the calibration targets 222 are placed on wings 212 and at a nose of a fuselage 210 of the aircraft. More or fewer calibration targets 222 may be used depending on the particular target structure 200, the locations of the local position detectors 202 or other factors that affect position determination for the target structure 200 within the first coordinate system.

The local position detectors 202 may interact with a processor 214 to determine locations of the calibration targets 222 within the first coordinate system. The processor 214 or the local position detectors 202 may determine the position and orientation of the target structure 200 within the first coordinate system based on the locations of the calibration targets 222 and based on one or more electronic representations of the target structure 200. The electronic representations of the target structure 200 may include electronic diagrams, drawings or models of the target structure 200, such as computer-aided design drawings or three-dimensional models. Additionally, the electronic representations may include design or as-built drawings or measured data (e.g., measurements taken for use by the local positioning system) indicating specifics of the target structure 200.

The processor 214 may also determine a second coordinate system based on the position and orientation of the target structure 200 within the first coordinate system. For example, the first coordinate system may be a local coordinate system (i.e., a coordinate system associated with the target structure) or a non-local coordinate system (i.e., a coordinate system associated with something other than the target structure, such as a building or a global reference system). Examples of non-local coordinate systems include coordinate systems that specify locations with reference to features that are not on the target structure, such as global systems that specify locations based on distances or directions to global features (e.g., global positioning coordinates, longitude and latitude, and so forth). In local coordinate systems, locations may be specified with reference to one or more known locations or features defined relative to the target structure.

In the second coordinate system, positions may be specified by distance or direction from features of the target structure 200. For example, a position may be specified by a distance and direction from the nose of the fuselage 210 of the aircraft illustrated in FIG. 2. The processor 214 may determine a relationship between positions in the first coordinate system and the second coordinate system based on the position and orientation of the target structure 200 within the first coordinate system and the electronic representations of the target structure 200.

FIG. 2 also shows a portable device 234 disposed in a calibration frame 230. For example, the portable device 234 may be a portable device such as the portable device 120 of FIG. 1 and the calibration frame 230 may be a calibration frame such as the calibration frame 150 of FIG. 1. The calibration frame 230 may be placed at a known position and orientation in the first coordinate system of the target structure. A spatial relationship between the calibration frame 230 and the local position detectors 202 may be known. For example, the calibration frame 230 and the local position detectors 202 may be placed at fixed, known positions within the first coordinate system. The calibration frame 230 may be located on or in the target structure 200, or the calibration frame 230 may be placed in other locations as long as its position and orientation are defined in the local target coordinate system. In addition or in the alternative, the calibration frame 230 may include one or more targets 232 that are detectable by the local positioning detectors 202 to enable the local positioning system to determine the position and orientation of the calibration frame 230 relative to the local position detectors 202 within the first coordinate system of the target structure.

The portable device 234 may include a memory to store an initial position and orientation of the portable device 234. The initial position and orientation of the portable device 234 may be stored relative to the first coordinate system, the second coordinate system, or both. In a particular embodiment, the position of the calibration frame 230 is set as an origin position of the second coordinate system. Thus, the memory of the portable device 234 may initially be set to zero in the calibration frame 230, indicating no movement from the origin position.

The portable device 234 may also include one or more movement sensors to detect movement of the portable device 234. For example, the movement sensors may include one or more microelectromechanical systems (MEMS), such as sensor devices that measure relative acceleration and velocity. The movement detected by the movement sensors may be used by the processor 214 to calculate a position and orientation of the portable device 234 after it is moved. The processor 214 may also be configured to provide an estimate of linear and rotational displacement during motion. In a particular embodiment, the processor 214 is onboard the portable device 234. In other embodiments, the processor 214 is external to the portable device 234. The processor 214 may determine a calculated position and orientation of the portable device 234 within the target structure 200 or near the target structure 200 based on the initial position and orientation of the portable device 234 (e.g., within the calibration frame 230) and based on movement of the portable device 234 detected by the one or more movement sensors.

To illustrate, the local positioning detectors 202 may include line-of-sight detectors, such as laser devices. Thus, positions at portions of the target structure 200 that are not within line of sight of the local position detectors 202, such as inside the fuselage 210, inside a wheel well (not shown), behind an obstruction, such as the wings 212 or other components of the target structure 200, may not be detectable by the local positioning detectors 202. Accordingly, the portable device 234 may be used to determine positions obscured from the local positioning detectors 202 or where placement of a target 222 would be burdensome or not desirable. In these cases, measurements will be based on the initial position and orientation of the portable device 234 and sensed relative motion of the portable device 234.

In operation, the portable device 234 may be used by an operator to locate components of the target structure 200, to gather or store information about a particular location of the target structure 200, to identify a component at a particular location of the target structure, or for other purposes. To illustrate, an operator attempting to locate a component of the target structure 200 may input information identifying the component at the portable device 234 or at a computing device (not shown) that downloads information to the portable device 234. A position of the component may be determined based on the electronic representations of the target structure 200. The processor 214 may determine the position of the component relative to the target structure 200, relative to the location of the portable device 234 (e.g., within the calibration frame 230), or relative to another location that can be readily identified by the operator.

In a particular embodiment, the portable device 234 includes an operator interface to provide information to the operator regarding the location of the component. For example, the operator interface may include a display screen. The display screen may display information to the operator regarding a direction, a distance, or the direction and distance to the component. Additionally, the display screen may provide other information to aid the operator in locating the component. For example, the operator interface may display a text description of the component or the location of the component or may display a photograph or diagram illustrating the component, etc. The operator interface may include other output devices in addition to or instead of a display screen. For example, the operator interface may include one or more indicators (e.g., lights, moveable arrows, etc.) adapted to indicate the direction or distance to the component. In another example, the operator interface may include a pointer, such as a visible laser, that points in the direction of the component. In still another example, the operator interface may include one or more audible or haptic output devices to indicate the direction or distance to the component. To illustrate, a vibrating element or a buzzer may be triggered when the operator takes the portable device 234 to within a predetermined distance of the component. The predetermined distance may be selected based on how easily the operator would be expected to identify the component. For example, the predetermined distance may be shorter (i.e., nearer to the component) for smaller components than for larger components. In another example, the predetermined distance may be shorter when the component would normally be obscured from view by another component (e.g., behind a panel).

To illustrate another operational example, an operator may use the portable device 234 to gather or store position data. For example, when the operator is performing an inspection, the portable device 234 may be used to ensure that locations inspected are correct or to store inspection findings with correct location information. To illustrate, the portable device 234 may be carried by the operator during non-destructive testing. Results of the non-destructive testing may be stored with output from the portable device 234 to ensure that appropriate locations were tested and to enable subsequently finding positions where the testing was performed. In another example, the portable device 234 may include or be included within a portable testing device or camera that includes a sensor used for testing or inspection of the target structure 200. When the operator identifies a concern, the portable device 234 may be used to store location and sensed data. For example, the operator may capture a digital image of an area of concern and the position of the area of concern may be stored with the digital image.

To illustrate another operational example, the portable device 234 may be used by the operator to assist with identifying a component at a particular location of the target structure 200. For example, the portable device 234 may include an input that the operator can use to select a particular position. The processor 214 may determine components of the target structure 200 that are near the particular position. The input may include a trigger, a button or another input device. In a particular embodiment, the portable device 234 includes a pointing device operable by the operator to point to the particular component. For example, the portable device 234 may include a laser device that generates a visible beam of light. The operator may point the beam of light at the component and select the input to generate a query. The query may request information regarding the component, such as an identification of the component, a purpose of the component, maintenance or assembly data regarding the component (e.g., torque specifications), or any combination thereof.

Figure 3:
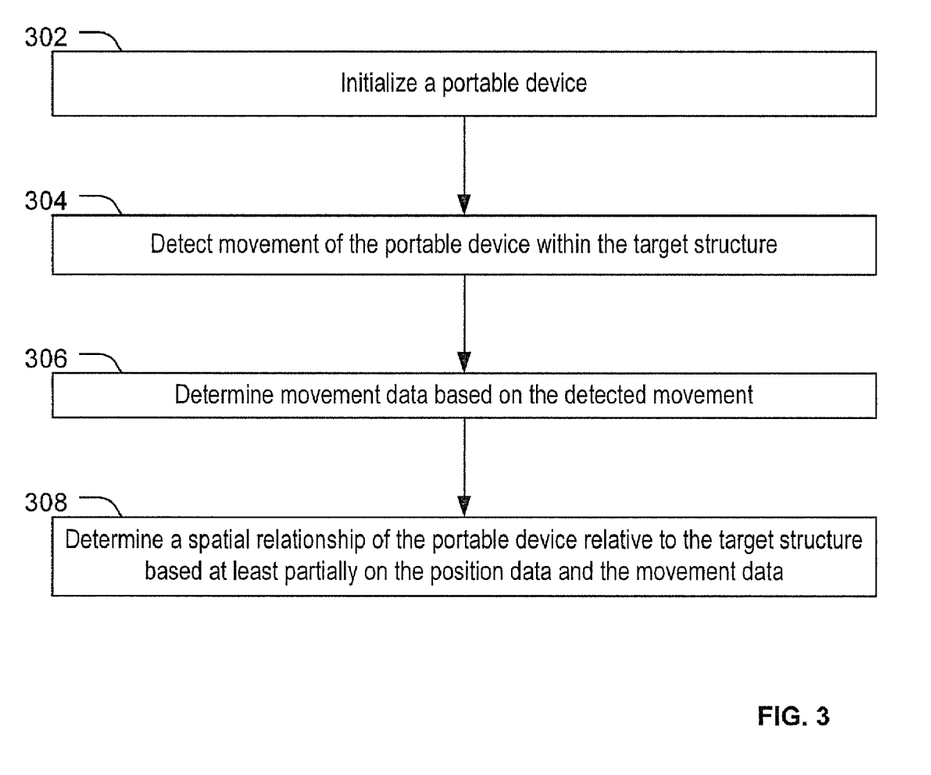
FIG. 3. is a flow chart of a first particular embodiment of a method of determining a spatial relationship of a portable device relative to a target structure.

FIG. 3. is a flow chart of first particular embodiment of a method of determining a spatial relationship of a portable device relative to a target structure. The method includes, at 302, initializing a portable device. For example, the portable device may include a device capable of sensing relative motion, such as the portable device 120 of FIG. 1 or the portable device 234 of FIG. 2. Initializing the portable device may include determining a location of the portable device relative to the target structure. For example, the portable device may be placed in a calibration frame, such as the calibration frame 150 of FIG. 1 or the calibration frame 230 of FIG. 2. The target structure may include a repositionable structure or mobile platform, such as an aircraft, a space craft, a water craft, a land craft; or another structure, such as a building. To illustrate, while the portable device is in the calibration frame, movement data in a memory of the portable device may be zeroed out indicating that the portable device is at a zero or origin location. In another illustrative example, another value indicating the position and orientation of the calibration frame may be stored in the memory of the portable device. Thus, an initial position and orientation of the portable device may be stored in the memory of the portable device.

The method also includes, at 304, detecting movement of the portable device within or on the target structure. For example, the portable device may include inertial sensors or other movement detection sensors capable of detecting movement of the portable device within or on the target structure. The method also includes, at 306, determining movement data based on the detected movement. For example, where the portable device includes inertial sensors, motion detected by the inertial sensors may be provided to a processor of the portable device to determine a direction, distance or other information indicating movement of the portable device. The movement data may be stored in a memory of a portable device or transmitted to a remote device for storage.

The method also includes, at 308, determining a spatial relationship of the portable device relative to the target structure based at least partially on the position data and the movement data. For example, when the movement data has indicated movement from the initial position of one hundred feet in a particular direction, the movement data and the initial position data may be used to determine a position of the portable device relative to the target structure.

Figure 4:
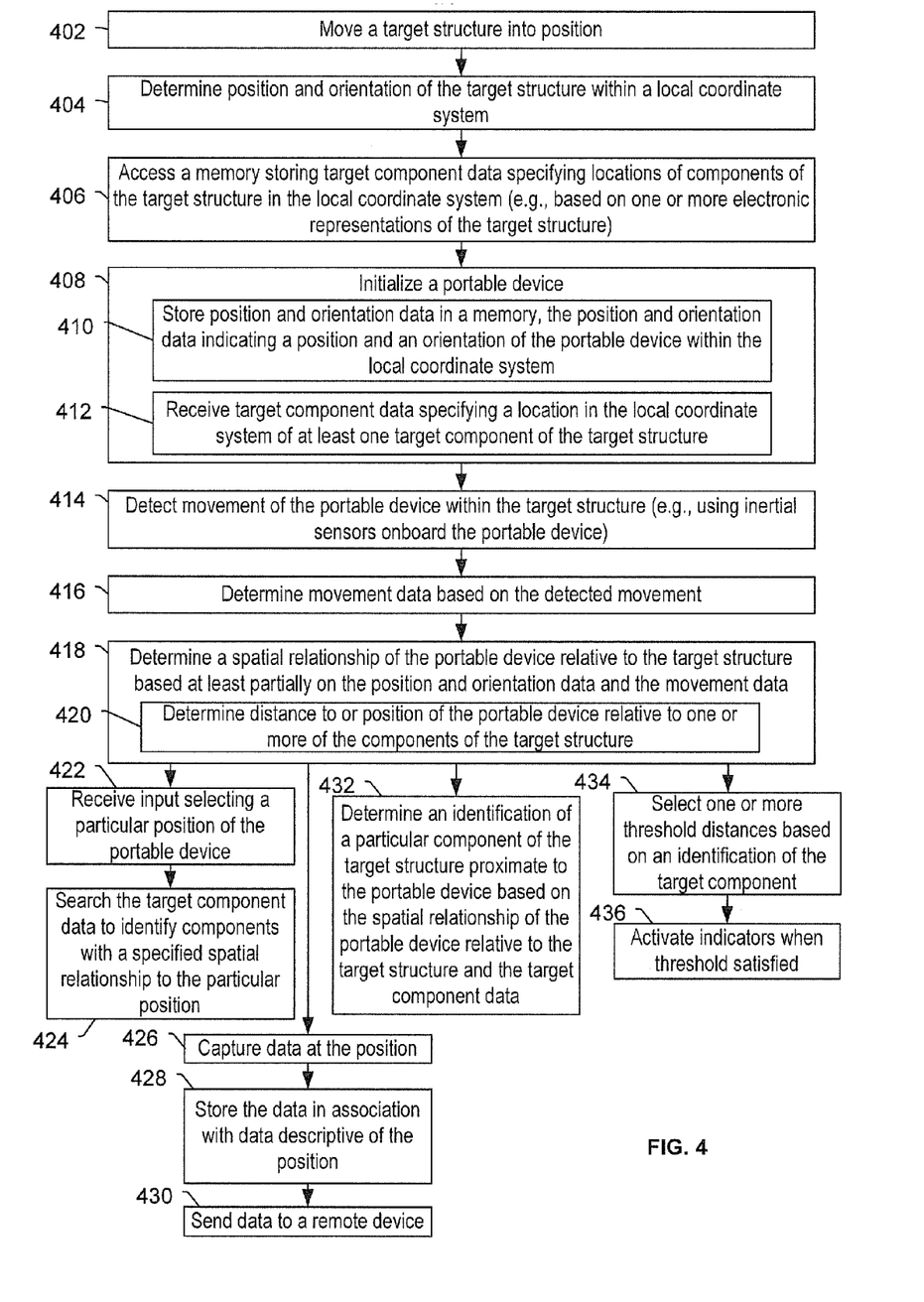
FIG. 4. is a flow chart of a second particular embodiment of a method of determining a spatial relationship of a portable device relative to a target structure.

FIG. 4. is a flow chart of a second particular embodiment of a method of determining a spatial relationship of a portable device to a target structure. The method includes, at 402, moving a repositionable target structure (such as an aircraft, a space craft, a water craft, or a land craft) into position. The method also includes, at 404, determining the position and orientation of the target structure within a local coordinate system. For example, when the target structure is an aircraft, the position and orientation may include a location of the aircraft within the local coordinate system as well as an angle, direction, elevation and so forth of the aircraft within the local coordinate system.

The method may also include, at 406, accessing a memory storing target component data. The target component data may specify locations of components of the target structure in the local coordinate system. For example, the target component data may be determined based on one or more electronic representations of the target structure. To illustrate, the target component data may be determined based on a plurality of design or as-built drawings of the target structure, a plurality of design or as-built three dimensional computerized models of the target structure or other electronic representations including information about the positions of the particular components of the target structure.

The method may also include, at 408, initializing a portable device. The portable device may be adapted to be carried by a user during interactions with the target structure and may determine position and orientation of the portable device in the local coordinate system based on movements of the portable device. For example, the portable device may include the portable device 120 of FIG. 1 or the portable device 234 of FIG. 2. In a particular embodiment, initializing the portable device includes, at 410, storing position and orientation data in a memory of the portable device. The position and orientation data may indicate the position and orientation of the portable device within the local coordinate system. For example, the position and orientation data may indicate an initial or starting position and orientation of the portable device (such as within a calibration frame) when the portable device is initialized. Initializing the portable device may also include, at 412, receiving target component data specifying a location in the local coordinate system of at least one target component of the target structure. A target component may refer to a component of the target structure that an operator is attempting to locate. The target component data indicating the location of the at least one target component may be stored in the memory of the portable device.

The method may also include, at 414, detecting movement of the portable device within the local coordinate system. For example, the portable device may be moved within the target structure. The movement may be detected using inertial sensors (e.g., microelectromechanical inertial sensors) or other movement detection devices onboard the portable device. In a particular embodiment, the local positioning system determines the position and orientation of the target structure within the local coordinate system using a line-of-sight positioning system, such as a laser positioning system. Accordingly, positions internal to the target structure may not be readily determined since they may not be within a direct line of sight to the local positioning system. In such embodiments, the portable device may enable a user to determine the position and orientation of the portable device or of a target component within the target structure without a line of sight to the local positioning system.

The method may also include, at 416, determining movement data based on the detected movement. For example, the movement data may indicate a direction, distance, or time of movement of the portable device based on the detected movement. The method may also include, at 418, determining a spatial relationship of the portable device relative to the target structure based at least partially on the position and orientation data determined at initialization of the portable device and based on the movement data determined based on the detected movement. For example, determining the spatial relationship may include, at 420, determining a distance to or a position of the portable device relative to one or more components of the target structure, or to a location of interest defined in the target structure's coordinate system. To illustrate, when a target component is identified and stored in the memory of the portable device, a distance from the portable device to the target component may be determined. In other uses, where no target component has been identified, the portable device may determine a location in the target structure where the portable device is located based on the initial position and orientation data and the movement data.

The method may include one or more additional actions depending on a specific task to be performed by the portable device. For example, when the portable device is being used to identify a particular component of the target structure, the method may include, at 422, receiving input at the portable device selecting a particular position (e.g., a location of interest). To illustrate, while a user is within the target structure, the user may select a trigger, a button or another input device to cause the portable device to store position and orientation data associated with a current position and orientation of the portable device. The particular position of the portable device may be used to search the target component data to identify components in a specified spatial relationship to a particular position, at 424. For example, when the user is trying to determine the identity of a particular component while within the target structure, the user may place the portable device near or in contact with the particular component in question and may store the particular position of the portable device. The target component data may be searched based on the position of the portable device to identify the particular component or to identify a set of components near the particular position.

In another example, the method may include, at 426, capturing data at the position of the portable device. The captured data may include, for example, data captured by a sensor integral with, coupled to, or associated with the portable device. For example, the portable device may include a sensor, such as a digital image sensor, a thermal sensor, another non-destructive test sensor, or any combination thereof. The sensor may capture the data at the location of the portable device. In another example, a user carrying the portable device may carry a separate sensor or sensing device capable of capturing data. The captured data may be stored, at 428, in association with data descriptive of the position of the portable device. For example, the user may provide input to the portable device to store a position of the portable device as the data is gathered. In another example, the portable device may automatically store the position when the captured data is captured or stored. The captured data, the position data, or both, may be sent to a remote device for analysis, at 430.

To illustrate a particular use, the portable device may be used by maintenance or assembly personnel to gather non-destructive test data associated with the target structure. The non-destructive test data may be gathered by the portable device or by another device. The non-destructive test data may be stored with position data determined by the portable device such that the location where the non-destructive test data was gathered is correctly identified. In another example, during an inspection, when an area of concern is identified, a digital image or other data associated with the area of concern may be captured and stored in association with data descriptive of the position of the area of concern and the data is sent to a remote device for analysis.

In still another example, the method may include, at 432, determining an identification of a particular component of the target structure that is proximate to the portable device based on the spatial relationship of the portable device relative to the target structure and the target component data. For example, when a user of the portable device is inside the target structure and desires to identify a particular component, the user may provide input to the portable device indicating to search for components within a predetermined spatial relationship of the portable device. The search may include a search of a memory of the portable device or a search of a remote database including the target component data. For example, the position of the portable device may be wirelessly transmitted to a remote device that implements the search of the remote database. Based on the location of the portable device, the data descriptive of the target structure and the target component data, the identification of the particular component may be determined.

In yet another example, the method may include, at 434, selecting one or more threshold distances based on an identification of a target component and, at 436, activating one or more indicators when one of the one or more threshold distances is satisfied. For example, when the target component is identified during initialization or during use of the portable device, the one or more threshold distances associated with the target component may be identified. A particular threshold distance may be determined based on, for example, a location of the target component, a size of the target component, or other information indicating generally how difficult or easy finding the target component is expected to be.

In a particular embodiment, a first threshold distance is used to activate a first indicator and a second threshold distance is used to activate a second indicator. For example, the first threshold distance may be satisfied when the portable device is more than a particular distance from the target component. The first indicator may include a pointer or other indicator associated with the portable device. The first indicator may be activated to indicate that the portable device is more than the first threshold distance from the target component. The first indicator may provide an indication of a direction to the target component, a distance to the target component, other information helpful to locate the target component (such as a direction to proceed to a particular identifiable area of the target structure, e.g., a cargo area) or any combination thereof. The second threshold distance may indicate that the portable device is within a second distance from the target component, and the second indicator may be activated when the second threshold distance is satisfied. The second threshold distance may be closer to the target component than the first threshold distance. To illustrate, during use, the first threshold distance may indicate that the portable device is in or near a bay or other enclosed area that includes the target component. The second threshold distance may indicate that the portable device is within a predetermined distance, such as arms length, a specified number of feet or meters, or another distance that is relatively near the target component.

Figure 5:
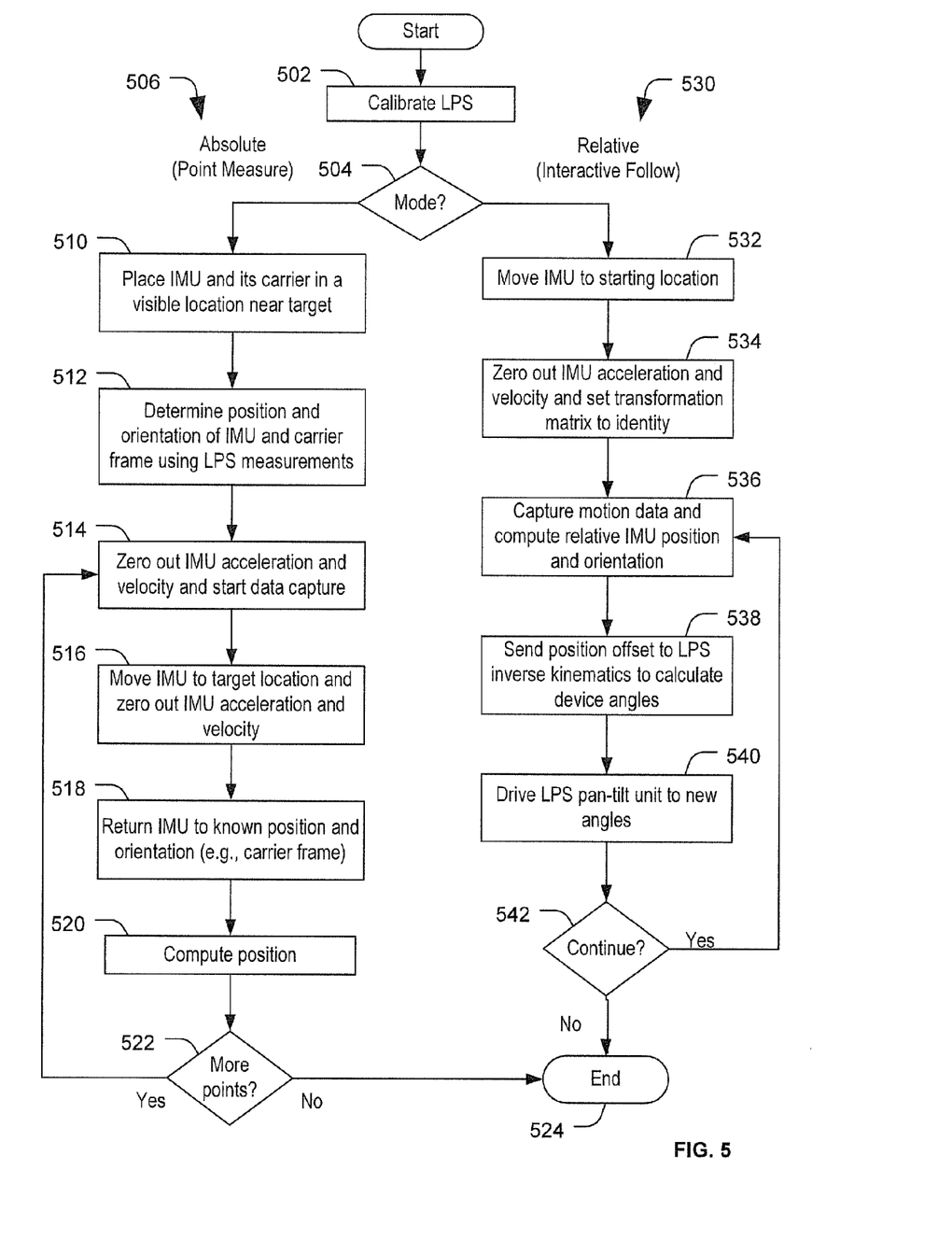
FIG. 5. is a flow chart of a third particular embodiment of a method of determining a spatial relationship of a portable device relative to a target structure.

FIG. 5. is a flow chart of a third particular embodiment of a method of determining a spatial relationship of a portable device relative to a target structure. The method includes, at 502, calibrating a local positioning system (LPS). For example, the LPS may include one or more position detectors, such as the local position detectors 104 of FIG. 1, or the local position detectors 202 of FIG. 2. The position detectors may interact with one or more targets to determine locations of the targets. In a particular embodiment, the LPS is calibrated by causing at least one position detector to measure calibration targets at known locations. The calibration targets may be at known locations defined in the coordinate system associated with a location (e.g., an assembly or maintenance area) or at known locations of a coordinate system associated with a target structure (e.g., an aircraft).

In a particular embodiment, the portable device includes an inertial measurement unit (IMU) to detect movement of the portable device and to measure positions relative to the target structure. The IMU may operate in one of two or more operational modes, such as an absolute mode 506 and a relative mode 530. The method may include determining the operational mode, at 504.

The absolute mode 506 may be used for point measurements, such as to determine a position of a target location that is out of a line of sight to the LPS. For example, when the IMU is used in the absolute mode 506, the method may include placing the IMU in a carrier, at 510. The carrier may be a portable or moveable calibration frame, such as the calibration frame 150 of FIG. 1 or the calibration frame 230 of FIG. 2. The carrier may include one or more LPS targets, such as the target locations 152 of FIG. 1, that enable the LPS to determine the position and orientation of the carrier. The IMU and the carrier may be moved to a visible location (i.e., a location with a line of sight to a local positioning device of the LPS, such as a laser measurement device). A more precise measurement may be determined if the visible location is relatively near the target location.

The method may also include determining the location of the IMU and the carrier (e.g., position and orientation of the IMU and the carrier) at the visible location by using the LPS to take measurements of the location, at 512. A memory of the IMU may be modified at the visible location. For example, acceleration and velocity data stored by inertial measurement components of the IMU may be zeroed out and the IMU may start capturing movement data, at 514. Locations that are not visible to the local positioning system may also be used if the local coordinate positions and orientations are known.

The method may include capturing movement data as the IMU is moved to the target location, at 516. When the IMU is at the target location, the memory of the IMU may again be modified to store information about the target location. For example, the acceleration and velocity data stored at the inertial measurement component of the IMU may again be zeroed out. A user may provide an input at the IMU to indicate that the target location has been reached. To illustrate, the user may select a button or other input device to indicate that the target location has been reached. The movement data captured while moving the IMU to the target location may be transmitted to a remote device, such as a component of the LPS. In an embodiment, a first memory stores position data related to moving the IMU from the carrier to the target location and a second memory stores position data related to moving the IMU from the target location back to the carrier. Alternately, the position data related to moving the IMU from the carrier to the target location may be zeroed out at the target location and replaced by position data related to moving the IMU from the target location back to the carrier.

The IMU may be returned to a known location (e.g., a known position and known orientation), such as the carrier, at 518. The position of the target location may be calculated, at 520, based on the position data stored by the IMU. The calculation process depends on the type of sensors used in the portable device. If the portable device uses an IMU equipped with accelerometers and gyroscopes, the process may involve a double integration of acceleration data to produce relative position offsets and integration of rotational velocity data to produce angular offsets. The calculation may include a drift compensation adjustment that uses known position and orientation data, along with the known zero acceleration and velocity conditions at the beginning and end of the motion sequence to correct for the sensor drift during motion. If more target points are to be measured, at 522, the method may zero out the IMU memory again, at 514. When no more target points are to be measured, at 522, the method terminates at 524.

The relative mode 530 may be used as an interactive following mode to cause a local measurement device of the LPS to point toward the IMU or toward another location based on movement of the IMU. For example, the relative mode 530 may include moving the IMU to a starting location, at 532. Position and orientation data may be modified at the starting location. For example, acceleration and velocity data may be zeroed out and a transformation matrix of the IMU may be set to identity, at 534.

The IMU may be moved by a user while an interactive following process is active at the LPS. For example, the user may activate the interactive following process of the LPS by providing input at the IMU (e.g., by selecting a button on the IMU). The interactive follow process may cause the positioning device of the LPS to move to mimic movements of the IMU. The interactive following process may include capturing motion data at the IMU and using the motion data to compute the IMU's location (e.g., position and orientation) relative to the starting location, at 536. The method may also include sending position offset data to a remote device, such as a component of the LPS, at 538. For example, the position offset data may be sent via a wireless transmission. The remote device may use inverse kinematics to calculate device angles to point the positioning device that is following the IMU. The method may also include sending commands to a positioning system of the local positioning device to cause the positioning device to point based on movement of the IMU. For example, the remote device may drive a pan-tilt unit to new angles based on the calculated device angles, at 540.

When the method is to continue, at 542, (e.g., when the user continues to hold down a button on the IMU) the method may return to 536 to capture additional motion data and to compute the IMU position relative to the previous location. When no additional motion is to be captured, the method terminates at 524.

Accordingly, the absolute mode 506 may enable measurement of target locations that are not in a line of sight to the LPS. The relative mode 530 may enable tracking of movements of the IMU by the LPS. The absolute mode 506, the relative mode 530, or both, may be used in conjunction with other methods disclosed herein. For example, the relative mode 530 may be used to designate a particular component to be measured or to be identified by causing the LPS to point to the particular component. In another example, the absolute mode 506 may be used to determine position data to be stored in conjunction with other capture data, such as nondestructive test data.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
   initializing a portable device by storing position and orientation data in a memory of the portable device, the position and orientation data indicating a position and orientation of the portable device within a local coordinate system associated with a target structure;
   detecting movement of the portable device;
   determining movement data based on the detected movement; determining a spatial relationship of the portable device relative to the target structure based at least partially on the position and orientation data and the movement data;
   when the spatial relationship is within a first threshold distance of a target component, activating a first indicator at the portable device; and
   when the spatial relationship is within a second threshold distance of the target component, activating a second indicator at the portable device, wherein the first threshold distance is different than the second threshold distance, and wherein the first indicator is distinct from the second indicator.

2. The method of claim 1, wherein initializing the portable device includes receiving target component data specifying a location in the local coordinate system of at least one target component of the target structure.

3. The method of claim 1, further comprising accessing a memory storing target component data specifying locations of components of the target structure in the local coordinate system, wherein the target component data specifies locations of the components of the target structure based on one or more electronic representations of the target structure.

4. The method of claim 3, wherein determining the spatial relationship of the portable device relative to the target structure includes determining a position and orientation of the portable device relative to one or more of the components of the target structure.

5. The method of claim 1, further comprising selecting the first threshold distance based on an identification of the target component.

6. The method of claim 1, wherein at least one of the first indicator and the second indicator indicates a direction to the target component.

7. The method of claim 1, wherein the target structure is one of an aircraft, a space craft, a water craft, and a land craft.

8. The method of claim 1, further comprising:
   receiving input at the portable device that selects a particular position of the portable device; and
   searching component data to identify one or more components of the target structure having a specified spatial relationship to the particular position.

9. A portable device, comprising:
   a calibration component to communicate with a local positioning system to determine an initial position and orientation of the portable device within a local coordinate system associated with a target structure;
   at least one movement sensor to detect movement of the portable device; and
   a processor to:
      determine a spatial relationship of the portable device relative to the target structure based on the initial position and orientation of the portable device within the local coordinate system and the detected movement of the portable device; and
      activate one of a first indicator and a second indicator at the portable device based on the spatial relationship, wherein the first indicator is activated when the spatial relationship is within a first threshold distance of the target structure, and wherein the second indicator is activated when the spatial relationship is within a second threshold distance of the target structure, wherein the first threshold distance is different than the second threshold distance, and wherein the first indicator is distinct from the second indicator.

10. The portable device of claim 9, further comprising a memory accessible to the processor, the memory storing target component data specifying locations of one or more components of the target structure in the local coordinate system, wherein the processor further determines the spatial relationship of the portable device relative to the target structure based on a second spatial relationship of the portable device relative to at least one target component of the one or more components of the target structure, wherein the processor determines the second spatial relationship based on the initial position and orientation of the portable device within the local coordinate system, the detected movement of the portable device, and the target component data.

11. The portable device of claim 10, further comprising an input device to receive an input specifying the at least one target component of the one or more components of the target structure.

12. The portable device of claim 10, further comprising a pointer adapted to point to a location of the at least one target component.

13. The portable device of claim 9, wherein the processor determines the spatial relationship of the portable device when the portable device is not in a line of sight to the local positioning system.

14. The portable device of claim 9, further comprising a sensor to capture data at a position within the target structure, wherein the processor stores the captured data with data descriptive of the position.

15. The portable device of claim 14, further comprising an interface to send the data descriptive of the position and the captured data to a remote device.

16. The portable device of claim 9, wherein the at least one movement sensor comprises one or more inertial sensors.

17. A positioning system, comprising:
   a plurality of local position detectors to determine a position and orientation of a location of interest on a target structure within a first coordinate system;
   a processor to determine a second coordinate system of the target structure based on the position and orientation of the target structure in the first coordinate system and based on at least a portion of one or more electronic representations of the target structure; and
   a portable device including:
      a memory to store an initial position and orientation of the portable device within the second coordinate system;
      at least one movement sensor to detect movement of the portable device; and
      a portable device processor to:
         determine a measured position and orientation of the portable device within the target structure based on the initial position and orientation of the portable device within the second coordinate system and based on the detected movement of the portable device;
         determine a spatial relationship of the portable device relative to the target structure based at least partially on the measured position and orientation of the portable device and the detected movement of the portable device;
         activate a first indicator at the portable device when the spatial relationship is within a first threshold distance of the target structure; and
         activate a second indicator when the spatial relationship is within a second threshold distance of the target structure that is different than the first threshold distance.

18. The system of claim 17, wherein the plurality of local position detectors comprise laser devices at known locations within the first coordinate system, the laser devices adapted to take measurements of a position and an orientation of the target structure within the first coordinate system.

19. The system of claim 18, further comprising a calibration frame including a plurality of target locations, wherein measurement data from the laser devices is used to determine the initial position and orientation of the portable device based on a position of the calibration frame.

20. The portable device of claim 11, wherein at least one of the first threshold distance and the second threshold distance is determined based on at least one of a size of the at least one target component and a location of the at least one target component.

* * * * *